United States Patent [19]
Davidson

[11] Patent Number: 5,993,753
[45] Date of Patent: Nov. 30, 1999

[54] CHLORINATOR/SANITIZER AND METHOD OF USING SAME

[75] Inventor: Donald R. Davidson, Chatham, N.J.

[73] Assignee: H-Tech, Inc., Wilmington, Del.

[21] Appl. No.: 09/022,352

[22] Filed: Feb. 11, 1998

Related U.S. Application Data

[60] Provisional application No. 60/037,710, Feb. 12, 1997.

[51] Int. Cl.$^6$ ..................................................... B01D 11/02
[52] U.S. Cl. ........................ 422/275; 422/277; 210/205; 210/232; 210/252; 210/253; 210/260
[58] Field of Search ..................................... 210/167, 169, 210/199, 205, 232, 244, 245, 252, 253, 254, 260; 422/261, 275, 277

[56] References Cited

U.S. PATENT DOCUMENTS

| | | |
|---|---|---|
| 3,899,425 | 8/1975 | Lewis . |
| 4,305,515 | 12/1981 | Rademacher . |
| 4,339,332 | 7/1982 | Jasperson . |
| 4,419,233 | 12/1983 | Baker . |
| 4,662,387 | 5/1987 | King, Sr. . |
| 4,780,197 | 10/1988 | Schuman . |
| 5,076,315 | 12/1991 | King . |
| 5,218,983 | 6/1993 | King . |
| 5,251,656 | 10/1993 | Sexton, Sr. ................................... 137/1 |
| 5,384,102 | 1/1995 | Ferguson et al. . |
| 5,407,567 | 4/1995 | Newhard . |
| 5,656,159 | 8/1997 | Spencer et al. . |

OTHER PUBLICATIONS

King Technology, Inc., "Frog Cycler" product installation manual, 1997.

Primary Examiner—Peter A. Hruskoci
Assistant Examiner—Betsey J. Morrison
Attorney, Agent, or Firm—Selitto & Associates, P.C.

[57] ABSTRACT

A dual chemical feeder device treats a fluid simultaneously with two different chemical compositions which may not be wholly compatible. In an exemplary embodiment for application in swimming pools, hot tubs, spas and the like, a chlorinator is combined with a sanitizing canister in a chlorinator/sanitizer to chemically treat the full flow of water through the apparatus with a chlorine-based chemical composition and another chemical composition. In alternate embodiments, the chlorinator/sanitizer is configured as a parallel treatment unit and as a series treatment unit. In the series treatment unit, the full flow through the chlorinator also flows through the sanitizing media in the santizing canister, so that all the water is both chlorinated and sanitized by the chlorinator/sanitizer. In the parallel treatment unit, the flow within the unit is divided into two streams which are separately treated. These two separately treated streams are then reunited and mixed together in the outlet chamber so that the water is both chlorinated and sanitized by the chlorinator/sanitizer.

22 Claims, 9 Drawing Sheets

CHLORINATOR/SANITIZER AND METHOD OF USING SAME

CROSS REFERENCE TO THE RELATED APPLICATION

This is a §111(a) application relating to U.S. application Ser. No. 60/037,710 filed Feb. 12, 1997.

FIELD OF THE INVENTION

The present invention relates to a dual chemical feeder device and method for chemical treatment of a fluid simultaneously with two different chemical compositions which may not be wholly compatible.

BACKGROUND OF THE INVENTION

Chlorinators for swimming pools, hot tubs, spas and the like are well known in the art. Chemical treatment of pool water with sanitizing media, other than chlorine, such as bactericides, germicides or algaecides is also known in the art. Combinations of chlorinators and other chemical treatment are limited in the art.

U.S. Pat. No. 5,407,567 discloses a compartmentalized swimming pool chemical dispenser for simultaneous introduction of at least two separately stored chemicals into the water of a swimming pool. However, that device is a passive, "tea bag" type device and contact of all of the pool water with the chemicals dispensed is not assured. A need exists for a combination of a chlorinator and sanitizer wherein the flow through the device is chlorinated and sanitized.

SUMMARY OF THE INVENTION

A multi-chemical feeder device has a housing with a fluid inlet and a fluid outlet, at least two chambers and a canister, with a hollow core, having an outer fluid-permeable member and an inner fluid-permeable member forming a space therebetween so as to contain a first chemical composition therein. The canister is positioned in a first chamber such that substantially all fluid flowing into that chamber passes through the canister and around the first chemical composition contained therein. A second chamber in the housing is adapted to contain a second chemical composition such that fluid flowing into the second chamber contacts the second chemical composition therein. The first chamber and the second chamber are arranged within the housing such that fluid flows into the housing through the fluid inlet and into the chambers before exiting the housing through the fluid outlet.

BRIEF DESCRIPTION OF THE DRAWINGS

For a better understanding of the present invention, reference is made to the following detailed description of an exemplary embodiment considered in conjunction with the accompanying drawings, in which.

DETAILED DESCRIPTION OF THE INVENTION

Figure 1:
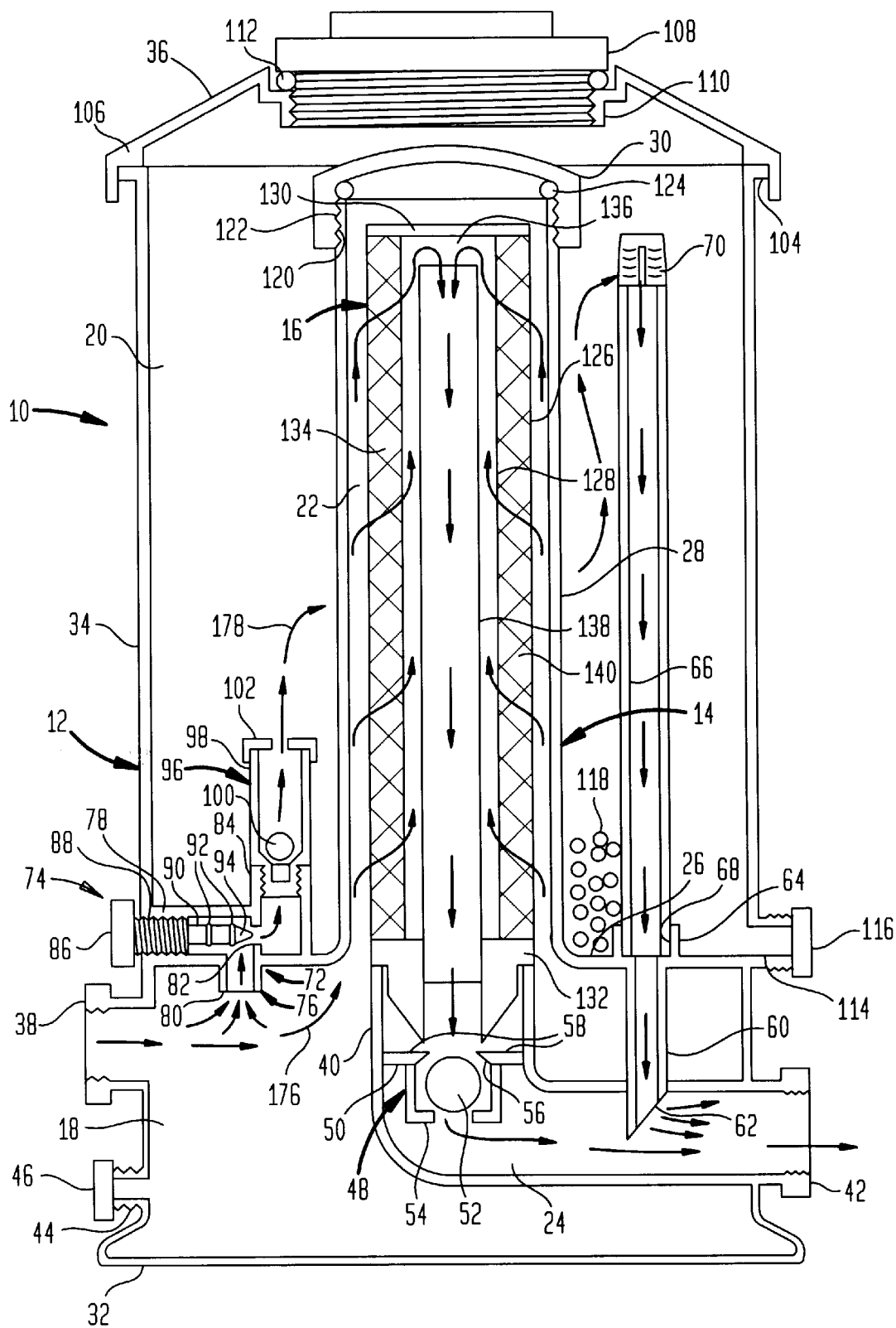
FIG. 1 is a cross-sectional view of a first exemplary embodiment of a chlorinator/sanitizer constructed in accordance with the present invention.

Referring to FIG. 1, there is shown a chlorinator/sanitizer 10, configured as a parallel dual chemical feeder device, which includes an exterior housing 12, an interior housing 14 and a sanitizing canister 16. The unit described is generally cylindrical, but can be configured in virtually any shape. Moreover, although the materials described herein are generally molded plastic, other materials and methods of fabrication suitable for the intended service may be utilized. These materials include, but are not limited to, composite materials including fiberglass and carbon fiber, metals including ferrous and non-ferrous metals, metals clad with other metals, metals lined with plastic, fiberglass or composites and metals coated with epoxy or other suitable coatings.

Referring still to FIG. 1, the interior housing 14 within the exterior housing 12 forms four chambers within the chlorinator/sanitizer 10, namely, an inlet chamber 18, a chlorinator chamber 20, a sanitizer chamber 22 and an outlet chamber 24. The interior housing 14 includes a division plate 26, a sanitizer standpipe 28 and an interior cover 30. The outer edge of the division plate 26 is molded to the interior of the exterior housing 12.

The exterior housing 12 includes a base 32, a body 34 and a cap 36. The base 32 includes a water inlet 38, an outlet tube 40 and a water outlet 42. An externally threaded drain tube 44, sealingly fitted with an internally threaded cap 46, is located near the bottom of the base 32. The inlet chamber 18 is formed within the hollow interior of the base 32, below the division plate 26 and around the outlet tube 40 and the water outlet 42.

The outlet tube 40 is integrally molded in the center of the base 32. The outlet tube 40 is a multifunctional part which supports, centers and seals the sanitizing canister 16 within the sanitizer chamber 22. A floating ball check valve 48 is positioned inside the lower, vertical portion of the outlet tube 40 to prevent any return flow into the sanitizing canister 16. The check valve 48 includes an annular plate 50, a spherical float 52 and a cage 54. The annular plate 50 includes a spherical seat 56 and three notches 58 (two of which are shown by broken lines). These notches 58 align with structures in the form of fingers, ribs or the like (not shown) in the base 32. The buoyancy of the spherical float 52 forces it sealingly into the spherical seat 56 in the annular plate 50 when there is no flow through the sanitizing canister 16. Alternatively, or in addition, the check valve 48 may be spring loaded (not shown).

The water outlet 42, which is in the form of a threaded, flanged, horizontal tube, is connected to the outlet tube 40. An outlet chamber 24 is formed by the hollow interiors of the outlet tube 40 and the water outlet 42. A venturi tube 60, attached to both the water outlet 42 and the division plate 26, fluidly connects the chlorinator chamber 20 to the outlet chamber 24. The venturi tube 60 includes an angled outlet 62 and an internally threaded inlet 64. A venturi standpipe 66 includes a threaded bottom 68 and a strainer cap 70 at the top. The bottom 68 of the venturi standpipe 66 is threadedly connected or, alternatively, glued with a suitable adhesive to the inlet 64 of the venturi tube 60 above the division plate 26. The venturi standpipe 66 extends from the division plate 26 to near the top of the chlorinator chamber 20.

Also attached to the division plate 26 is a metering valve 72. The metering valve 72 includes a valve spindle 74 and a valve body 76 with internal threads 78. The valve body 76 includes an inlet 80, which extends into the inlet chamber 18, an orifice 82 and an internally threaded outlet 84, which extends into the chlorinator chamber 20. The valve spindle 74 includes a handle 86 attached to a threaded shaft section 88, which is attached, in turn, to a smooth shaft section 90 with o-ring seals 92 and a conical tip 94. The o-ring seals 92 fit grooves (not shown) in the smooth shaft section 90 just past the threaded shaft section 88 and at the base of the conical tip 94. The threaded shaft section 88 fits threadedly into the internal threads 78 of the valve body 76, thereby sealingly engaging the seals 92 in the valve body 76. In the closed position, the o-ring 92, at the base of the conical tip 94, sealingly fits the orifice 82 in the valve body, thereby stopping fluid flow between the inlet chamber 18 and the chlorinator chamber 20 through the metering valve 72.

A ball check valve 96 includes a body 98, a ball 100 and a retaining cap 102. The body 98 is threadedly connected to the internally threaded outlet 84 of the metering valve 72. The ball 100 may be weighted or spring loaded (not shown) within the body 98, so as to prevent flow from the chlorinator chamber 20 to the inlet chamber 18. The retaining cap 102 is attached to the top of the body 98 and may be fitted with a screen (not shown).

The upper body 34 of the exterior housing 12 includes an annular flange 104. The cap 36 includes an outer annular shoulder 106, a threaded outer cover 108 and an open, flanged, internally threaded tube 110 in the center of the cap 36. The outer cover 108 threadedly engages the internally threaded tube 110, thereby compressing an o-ring 112 effecting a fluid-tight seal between the outer cover 108 and the cap 36. The outer annular shoulder 106 of the cap 36 is sealingly attached with a suitable adhesive to the annular flange 104. The lower body 34 also includes an externally threaded drain tube 114 and an internally threaded drain cap 116 which threadedly engages the drain tube 114.

The chlorinator chamber 20 is bounded between the exterior housing 12, the interior housing 14, the division plate 26, and the cap 36. By removing the outer cover 108, the chlorinator chamber 20 is filled with a chemical treatment media 118, typically a chlorine composition in tablet form for a chlorinator/sanitizer 10. However, any chemical treatment media 118 suitable for the fluid, either liquid or gas, being treated may be utilized as appropriate in either the chlorinator chamber 20 or the sanitizing canister 16.

The sanitizer standpipe 28, which includes an externally threaded top 120 extends into the chlorinator chamber 20. The interior cover 30 has internal threads 122 which threadedly engage the external threads on the top 120 of the sanitizer standpipe 28, thereby compressing an o-ring 124 and forming a fluid-tight seal between the interior cover 30 and the sanitizer standpipe 28.

The disposable sanitizing canister 16 is positioned within the sanitizer chamber 22, formed by the hollow interior of the sanitizer standpipe 28 fitted with the interior cover 30. The sanitizing canister 16 includes an outer perforated tube 126 and an inner perforated tube 128, preferably of plastic mesh, but alternatively of metallic mesh. The sanitizing canister 16 also includes an end cap 130 and an outlet fitting 132 of plastic, metal or any other suitable material. The perforated tubes 126, 128 are suspended and fixed between the end cap 130 and the outlet fitting 132, forming an annular space 134 between the outer perforated tube 126 and the inner perforated tube 128. While the space 134 is shown as being annular, the space 134 can be of any toroidal shape. The inside of the inner perforated tube 128 is a hollow core 136. An inner solid wall tube 138, of plastic, metal or any other suitable material, is fixed at one end to the outlet fitting 132 and extends within the hollow core 136 so that the other end is near the end cap 130.

The sanitizing canister 16 contains a sanitizing media 140. The sanitizing media 140, typically in the form of pellets, tablets or a granular composition, is contained within the annular space 134. The sanitizing media is in a bed in the shape of the space 134. In other words, if the space 134 is toroidal, the sanitizing media will be in a toroidally-shaped bed. The sanitizing media 140 may include any bactericidal, germicidal, algaecidal or other biocidal substances suitable for the particular application. Silver-based bactericides or biocides, which include such things as elemental silver coated or impregnated carriers, divalent silver compositions and trivalent silver compositions, are particularly effective for some water applications. Electrolytic metal compositions, including silver and copper, copper and zinc or any other suitable combination, may also be used. Chlorine based compositions may also be acceptable, as well as any suitable water treatment media.

The formation and use of the canister element in the present invention is similar to the formation and use of the sanitizing cartridge disclosed in copending application Ser. No. 09/014,448, entitled Filter/Sanitizer and Method of Using Same, submitted Jan. 28, 1998 having inventor and assignee in common with the present application, said prior application being incorporated herein by reference for its teachings in that regard. Since one can readily envision that the teachings with regard to a filter/sanitizer in the aforementioned prior application may be combined with the teachings with regard to a chlorinator/sanitizer contained herein to form a chlorinator/filter/sanitizer, the aforesaid application is also incorporated herein for its teachings enabling the combination of a chlorinator/filter/sanitizer.

Figure 2:
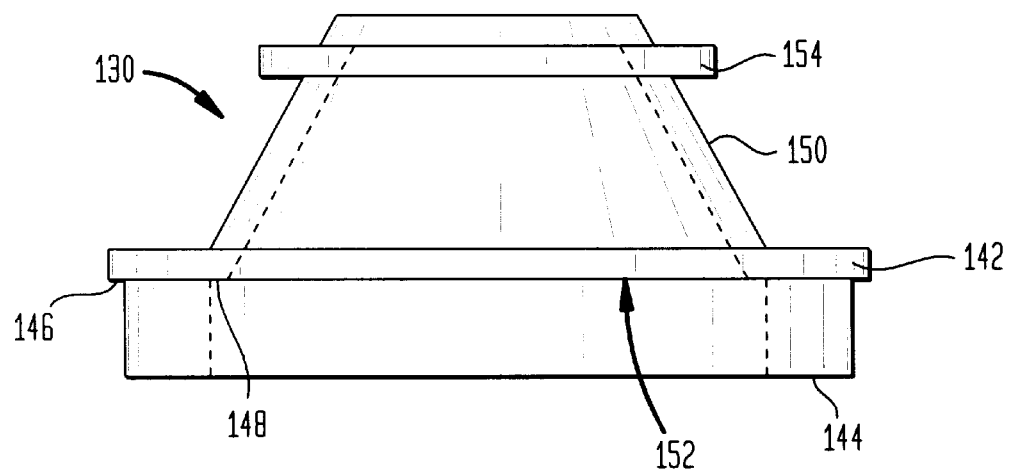
FIG. 2 is an elevation of the sanitizing canister end cap for the chlorinator/sanitizer shown in FIG. 1.
Figure 3:
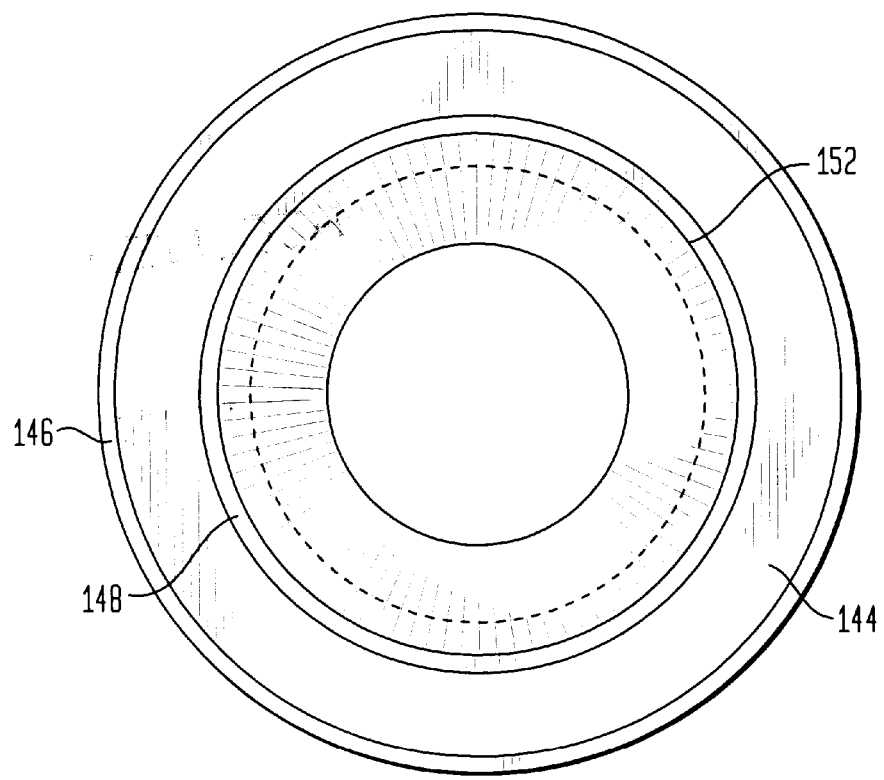
FIG. 3 is a bottom plan view of the sanitizing canister end cap shown in FIG. 2.

Referring to FIGS. 2 and 3, end cap 130 of the sanitizing canister 16 includes an annular partition 142 with a concentric, solid tube 144 affixed to one side. The tube 144 has an outer diameter less than the outer diameter of the partition 142, and forms an outer annular shoulder 146 around the outside of the partition 142. The outer perforated tube 126 rests on the outer annular shoulder 146 and is fixed to the partition 142 and the outside of tube 144 with epoxy or another suitable adhesive. The tube 144 has an inner diameter greater than the inner diameter of the partition 142 and forms an inner annular shoulder 148 around the inside of the partition 142. The inner perforated tube 128 rests on the inner annular shoulder 148 and is fixed to the partition 142 and the inside of the tube 144 with epoxy or another suitable adhesive.

Still referring to FIGS. 2 and 3, the portion of the end cap 130 above the partition 142 includes a hollow frustum 150 with a large circular opening 152 in the bottom of the frustum 150. An external flange 154 is positioned just below the top of the hollow frustum 150. The flange 154 functions as a handle to lift the sanitizing canister 16.

The other end of the sanitizing canister 16 has a tubular outlet fitting 132. The outlet fitting 132 seals the annular space 134 containing the sanitizing media 140 and sealingly seats the sanitizing canister 16 in the outlet tube 40 in the base 32. This arrangement causes all of the fluid flow into the sanitizer chamber 22 to pass through the sanitizing canister 16 before exiting through the outlet tube 40.

Figure 4:
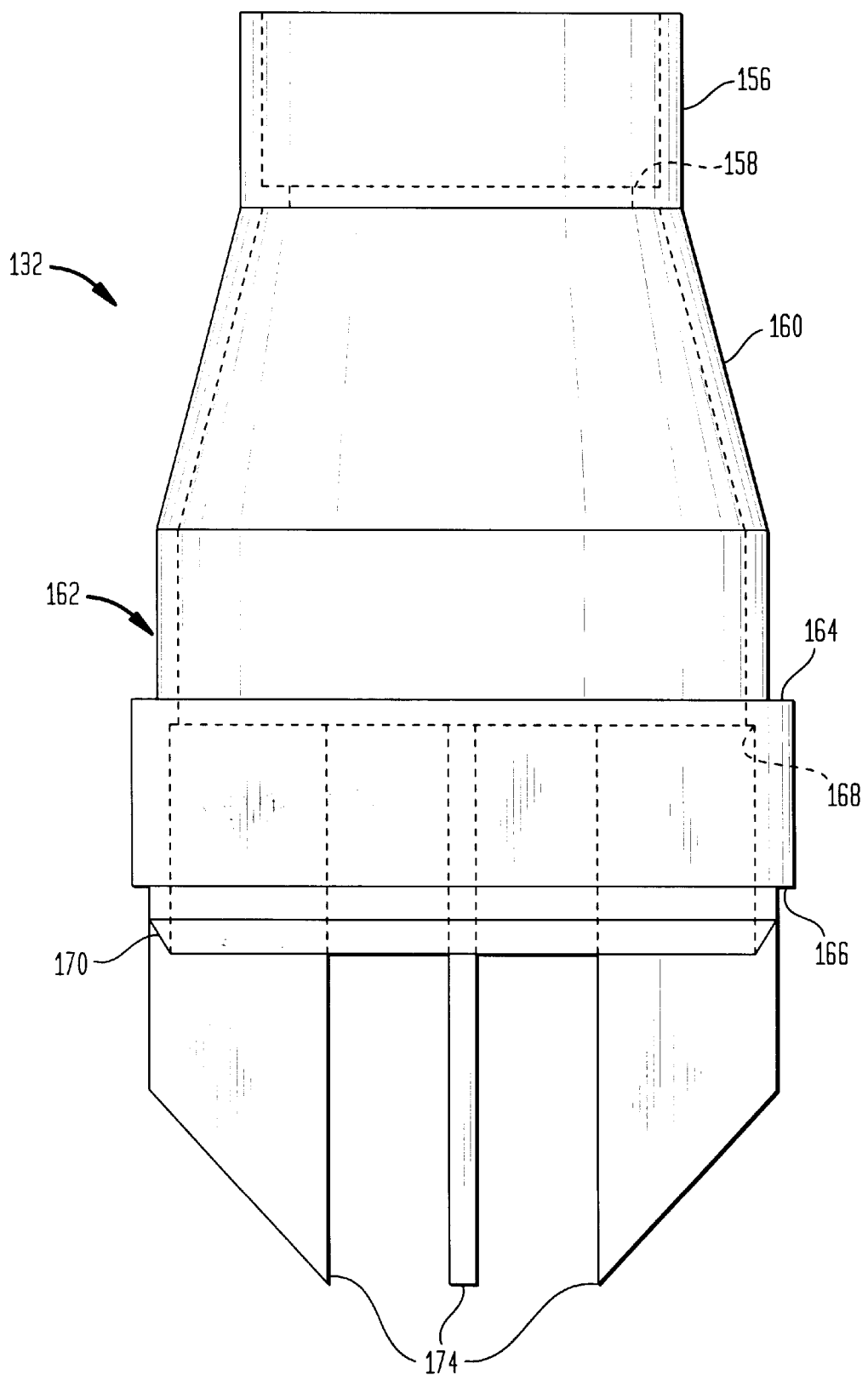
FIG. 4 is an elevation of the sanitizing canister outlet fitting for the chlorinator/sanitizer shown in FIG. 1.
Figure 5:
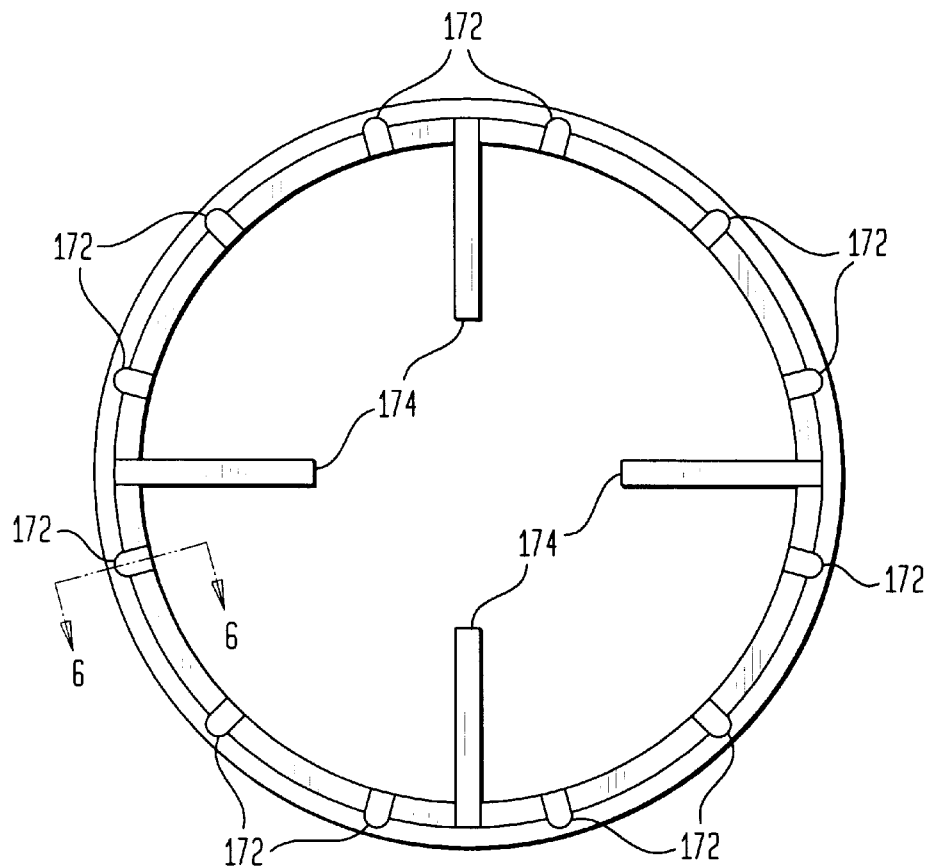
FIG. 5 is a bottom plan view of the sanitizing canister outlet fitting shown in FIG. 4.
Figure 6:
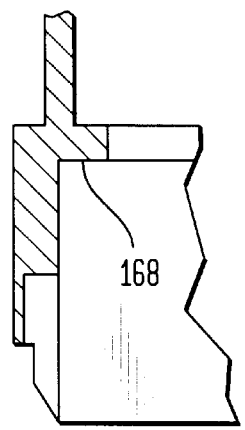
FIG. 6 is a sectional view of the sanitizing canister outlet fitting taken along section line A—A in FIG. 5.

Referring to FIGS. 4–6, the outlet fitting 132 includes three sections. The top section 156 is tubular with an internal, annular shoulder 158. The middle section 160 is a tubular frustum with a larger diameter bottom. The bottom section 162 is also tubular. The bottom section includes three annular shoulders; namely, an external, upper shoulder 164, an external, lower shoulder 166 and an internal shoulder 168. A chamfer 170 is included around the lower end of the bottom section 162.

Twelve identical notches 172 are symmetrically spaced about the lower end of the bottom section 162. Also attached to the lower end of the bottom section 162 are four identical tapered fingers 174. The tapered fingers 174 are spaced at 90° intervals, equidistantly between adjacent notches 172 (see FIG. 5). These notches 172 align with structures in the form of fingers, ribs or the like (not shown) in the base 32. The number and orientation of these notches 172 or other openings or protrusions and the corresponding structures in the filter base 32 can be varied to uniquely fit a particular sanitizing canister 16 to a uniquely corresponding chlorinator/sanitizer 10.

Referring now to FIG. 4, the inner solid wall tube 138 slides into the top section 156 of the outlet fitting 132, rests upon the annular shoulder 158 and is fixed inside the top section 156 with epoxy or another suitable adhesive. The inner perforated tube 128 slides around the top section 156 of the outlet fitting 132 and is fixed to the outside of the top section 156 with epoxy or another suitable adhesive. The outer perforated tube 126 slides around the top of the bottom section 162 and rests on the external, upper shoulder 164. The outer perforated tube 126 is also fixed to the bottom section 162 with epoxy or another suitable adhesive. The connections of the outlet fitting 132 and the end cap 130 to the perforated tubes 126, 128 seal the sanitizing media 140 within the annular space 134 between the perforated tubes 126, 128 completing the sanitizing canister 16. When the sanitizing canister 16 is positioned inside the sanitizer chamber 22, the external lower shoulder 166 of the outlet fitting 132 sealingly rests on the top of the outlet tube 40.

During operation in a typical swimming pool water circulation system, the chlorinator/sanitizer 10 may operate as an in line system, located after the filter, whereby all of the water from the circulating pump is treated. Alternatively, the chlorinator/sanitizer 10 may operate as a bypass or off-line system, typically arranged in parallel with a filter unit, so that only a small portion of the water from the pump is treated.

In either case, again referring to FIG. 1, the flow through the chlorinator/sanitizer 10 begins at the water inlet 38 into the inlet chamber 18. There the flow may be divided between two parallel flow paths, depending on the position of the metering valve 72. The primary flow path is indicated by the large flow arrows 176 and is active regardless of the position of the metering valve 72. The secondary flow path is indicated by the small flow arrows 178 and varies with the position of the metering valve 72.

In the primary flow path, water flows from the inlet chamber into the sanitizer chamber 22. The cylindrical sanitizing canister 16 is positioned within the hollow interior of the sanitizer standpipe 28 in the sanitizing chamber 22 so that a clearance between the inside of the sanitizer standpipe 28 and the outer perforated tube 126 of the sanitizing canister 16, sufficient for water to circulate, is maintained. By maximizing the diameters of the outer perforated tube 126 and the inner perforated tube 128, the inlet and outlet areas of the sanitizing canister 16 are also maximized. This maximization of areas, in conjunction with minimizing the thickness of the layer of sanitizing media 140, enables the full flow of the water through the chlorinator/sanitizer 10 to pass through the sanitizing canister 16 without an excessive pressure drop.

The outlet fitting 132 of the sanitizing canister 16 is removably and sealingly positioned in the outlet tube 40. All of the water in the primary flow path flows through the sanitizing media 140 in the annular space 134 within the sanitizing canister 16, then into its cylindrical hollow core 136. The water must flow to the top of the hollow core 136, then, into and through the inner solid wall tube 138 to pass out of the sanitizing canister 16 into the outlet chamber 24. This insures that air is drawn through the sanitizing canister 16 and does not build up in the sanitizer chamber 22. Finally, the water flows through the outlet tube 40 and into the water outlet 42 where it mixes with any water from the secondary flow path before exiting the chlorinator/sanitizer 10.

The amount of water flowing through the secondary flow path is determined by the position of the metering valve 72 and the pressure drops along each flow path. The pressure drop between the inlet chamber 18 where the primary and secondary flow paths separate and the water outlet 42 where they reunite must be the same. When the metering valve 72 is closed, there is no flow along the secondary flow path. All the flow follows the primary flow path and, accordingly, is only treated by the sanitizing media 140.

When the metering valve 72 is open, the flow of water along the secondary flow path may be adjusted up to the maximum flow which occurs when the metering valve 72 is fully open. Along the secondary flow path, water flows from inlet chamber 18, through the metering valve 72 and then through the ball check valve 96 into the chlorinator chamber 20. The water flows through and dissolves the chlorine chemical treatment media 118 within the chlorinator chamber 20 and becomes highly chlorinated. The strainer cap 70 prevents solid chlorine chemical treatment media 118 from leaving the chlorinator chamber 20. The now highly chlorinated water flows out of the chlorinator chamber 20 through the strainer cap 70, down the venturi standpipe 66 and through the venturi tube 60 into the outlet chamber 24. This insures that air is drawn through the venturi standpipe 66 and does not build up in the chlorinator chamber 20. The angled outlet 62 of the venturi tube 60 is positioned in the primary flow path through the water outlet 42 so as to cause a venturi effect. This venturi effect lowers the pressure at the angled outlet 62 of the venturi tube, thereby increasing the pressure drop and the flow along the secondary flow path. The highly chlorinated water in the secondary flow path mixes with the sanitized water in the primary flow path in the water outlet 42. Thus, upon mixing, the water through the chlorinator/sanitizer 10 is sanitized and chlorinated.

When there is no flow through the chlorinator/sanitizer 10, the ball check valves 48 and 96 prevent highly chlorinated water migrating from the chlorinator chamber 20 to the sanitizer chamber 22. Therefore, a sanitizing media 140 that is not wholly compatible with the chlorine chemical treatment media 118 may be utilized.

Figure 7:
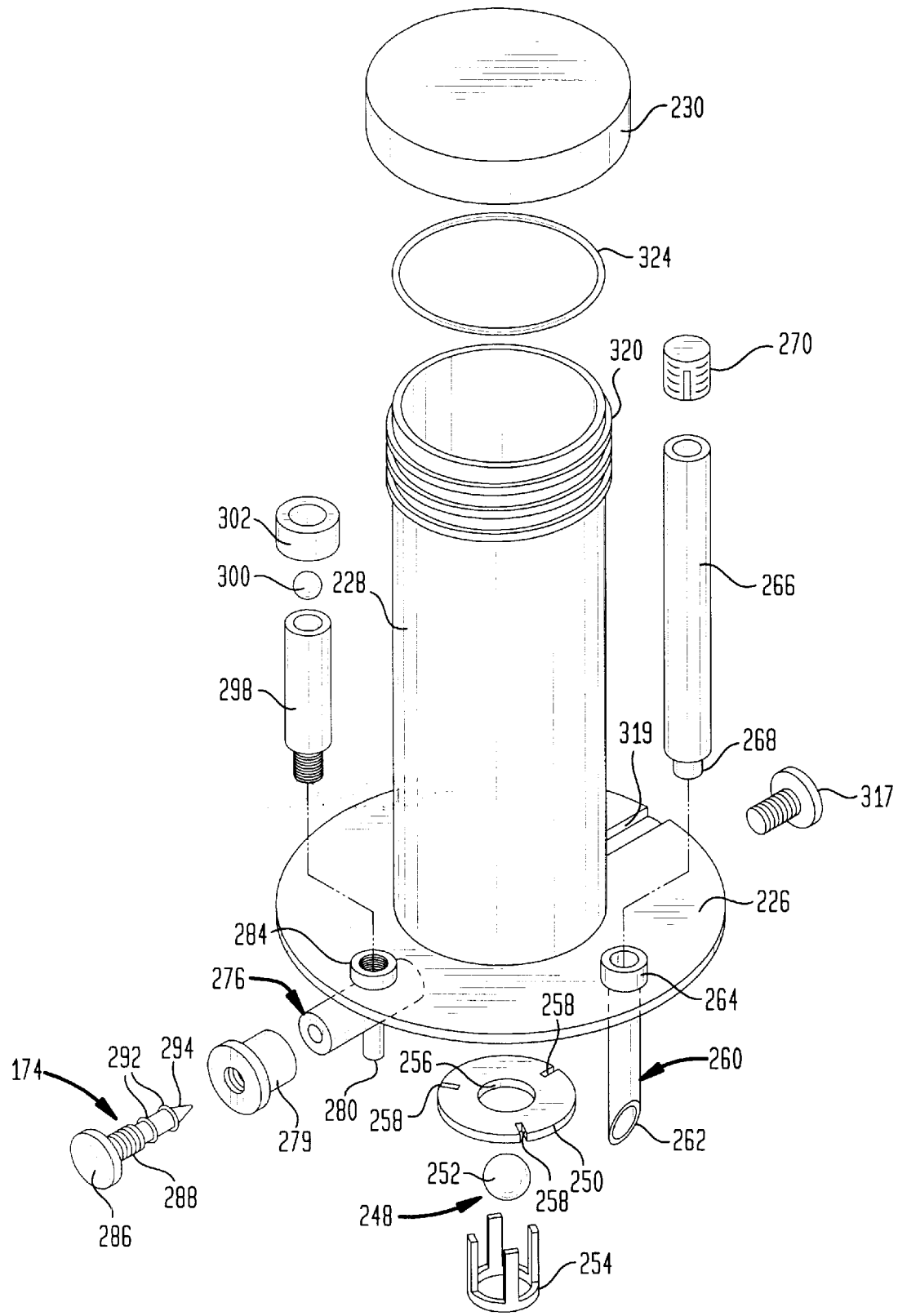
FIG. 7 is an exploded perspective view in a second exemplary embodiment of various internal parts used to convert a Hayward model C250CF, C-500CF, C-1100CF or C-1800CF Automatic Chemical Feeder or the like into a chlorinator/sanitizer as shown generally in FIG. 1.

While FIGS. 1–6 represent a preferred embodiment of the present invention, an alternate embodiment is illustrated in FIG. 7. FIG. 7 represents the internal parts required to convert a commercially available Hayward Model C-250CF, C-500CF, C-1100CF or C-1800CF Automatic Chemical Feeder or the like into a chlorinator/sanitizer 10 as shown generally in FIGS. 1–6. To facilitate consideration and discussion, all elements, whether or not illustrated in FIG. 7, which correspond to the elements described above with respect to FIGS. 1–6 have been designated by corresponding reference numerals increased by two hundred. Elements illustrated in FIG. 7 which have no counterparts in FIGS. 1–6 are designated by odd reference numerals. Unless otherwise stated, the embodiment represented in part by FIG. 7 includes all of the elements and operates in the same manner as the embodiment of FIG. 1–6.

The interior housing 214 is attached to the exterior housing by gluing the outer edge of the division plate 226 to the interior of the exterior housing 212, with a suitable adhesive, so as to form a fluid tight seal. The outlet tube 240 is either integrally molded or glued, with a suitable adhesive, in the center of the base 232.

The metering valve 272 includes an internally threaded boss 279 which is attached to the valve body 276. The threaded shaft section 288 of the valve spindle 274 fits threadedly into the threaded boss 279 attached to the valve body 276.

The division plate 226 includes a depression 319 aligned with an internally threaded drain tube (not shown). The externally threaded drain plug 317 threadedly and sealingly fits the internally threaded drain tube (not shown).

Figure 8:
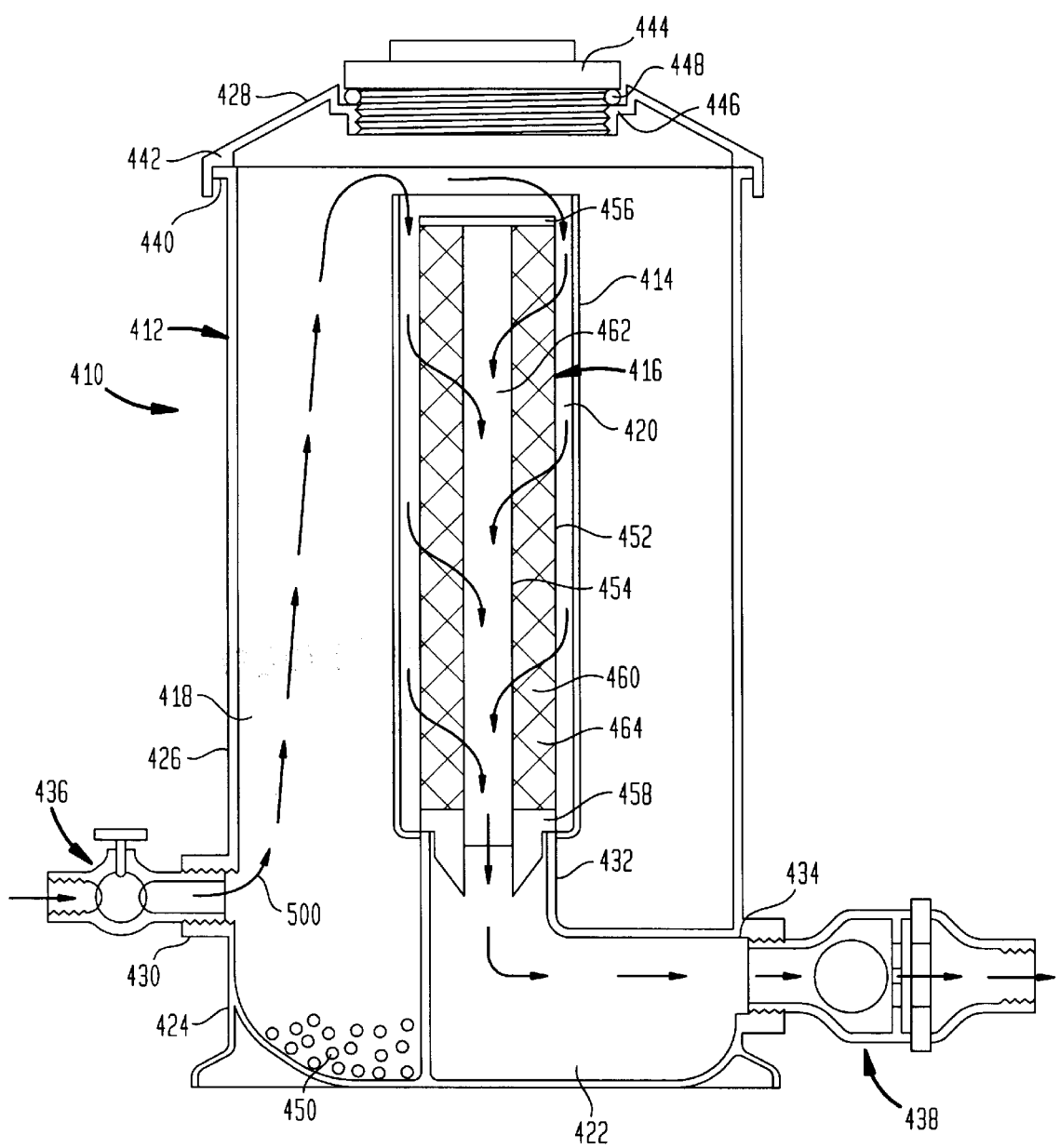
FIG. 8 is a cross-sectional view of a third exemplary embodiment of a chlorinator/sanitizer constructed in accordance with the present invention.

Referring to FIG. 8, in a third alternate embodiment of the invention, there is shown a chlorinator/sanitizer 410, configured as a series dual chemical feeder device, which includes a housing 412, a standpipe 414 and a sanitizing canister 416. Before discussing each in detail, it is noted that the housing 412 is from a commercially available Hayward model C-250CF, C-500CF, C-1100CF or C-1800CF Automatic Chemical Feeder. However, it should be understood that the invention is not limited to this particular equipment. Moreover, although the materials described herein are generally molded plastic, other materials and methods of fabrication suitable for the intended service may be utilized. These materials include, but are not limited to, composite materials including fiberglass and carbon fiber, metals including ferrous and non-ferrous metals, metals clad with other metals, metals lined with plastic, fiberglass or composites and metals coated with epoxy or other suitable coatings.

Referring still to FIG. 8, the attachment of the standpipe 414 within the housing 412 forms three chambers within the chlorinator/sanitizer 410, namely, a chlorinator chamber 418, a sanitizer chamber 420 and an outlet chamber 422. The housing 412 includes a base 424, a body 426 and a cap 428. The base 424 includes a water inlet 430, an outlet tube 432 and a water outlet 434. A metering valve 436 is connected to the water inlet 430. A screen (not shown) may be attached to the water inlet 430 to prevent fouling of the metering valve 436. The standpipe 414 is attached to the outlet tube 432, thereby forming the sanitizer chamber 420 within the hollow interior of the standpipe 414. The chlorinator chamber 418 is formed within the hollow interior of the housing 412, around the standpipe 414, the outlet tube 432 and the water outlet 434.

The outlet tube 432 is integrally molded or glued in the center of the base 424. The outlet tube 432 is a multifunctional part which supports, centers and seals the sanitizing canister 416 within the sanitizer chamber 420. The water outlet 434 is connected to the outlet tube 432. An outlet chamber 422 is formed by the hollow interiors of the outlet tube 432 and the water outlet 434.

A ball check valve 438 is connected to the water outlet 434. The ball check valve 438 may be spring loaded (not shown), so as to prevent any return flow from entering the chlorinator/sanitizer 410.

The upper body 426 of the housing 412 includes an annular flange 440. The cap 428 includes an outer annular shoulder 442, a threaded cover 444 and an open, flanged, internally threaded tube 445 in the center of the cap 428. The cover 444 threadedly engages the internally threaded tube 446, thereby compressing an o-ring 448 effecting a fluid-tight seal between the cover 444 and the cap 428. The outer annular shoulder 442 of the cap 428 is sealingly attached to the annular flange 440.

By removing the cover 444 in the cap 428, the chlorinator chamber 418 is filled with a chemical treatment media 450, typically a chlorine composition in tablet form for a chlorinator/sanitizer 410. However, any chemical treatment media 450 suitable for the fluid, liquid or gas, being treated may be utilized as appropriate in either the chlorinator chamber 418 or the sanitizing canister 416.

The standpipe 414 is sealingly attached to the outlet tube 432, with epoxy or another suitable adhesive, and extends as high as possible into the chlorinator chamber 418, forming the sanitizer chamber 420. The disposable sanitizing canister 416 is positioned within the sanitizer chamber 420. The sanitizing canister 416 includes an outer perforated tube 452 and an inner perforated tube 454, preferably of plastic mesh, but alternatively of metallic mesh. The sanitizing canister 416 also includes an end cap 456 and an outlet fitting 458 of plastic, metal or any other suitable material. The perforated tubes 452, 454 are suspended and fixed between the end cap 456 and the outlet fitting 458, forming an annular space 460 between the outer perforated tube 452 and the inner perforated tube 454. While this space 460 is shown as being annular, the space 460 can be of any toroidal shape. The inside of the inner perforated tube 454 is a hollow core 462.

The sanitizing canister 416 contains a sanitizing media 464. The sanitizing media 464, typically in the form of pellets, tablets or a granular composition, is contained within the annular space 460. The sanitizing media is in a bed in the shape of the space 460. In other words, if the space 460 is toroidal, the sanitizing media will be in a toroidally shaped bed. The sanitizing media 464 may include any bactericidal, germicidal, algaecidal or other biocidal substances suitable for the particular application. Silver-based bactericides or biocides, which include such things as elemental silver coated or impregnated carriers, divalent silver compositions and trivalent silver compositions, are particularly effective for some water applications. Electrolytic metal compositions, including silver and copper, copper zinc or any other suitable combination, may also be used. Chlorine based compositions may also be acceptable, as well as any suitable water treatment media.

Figure 9:
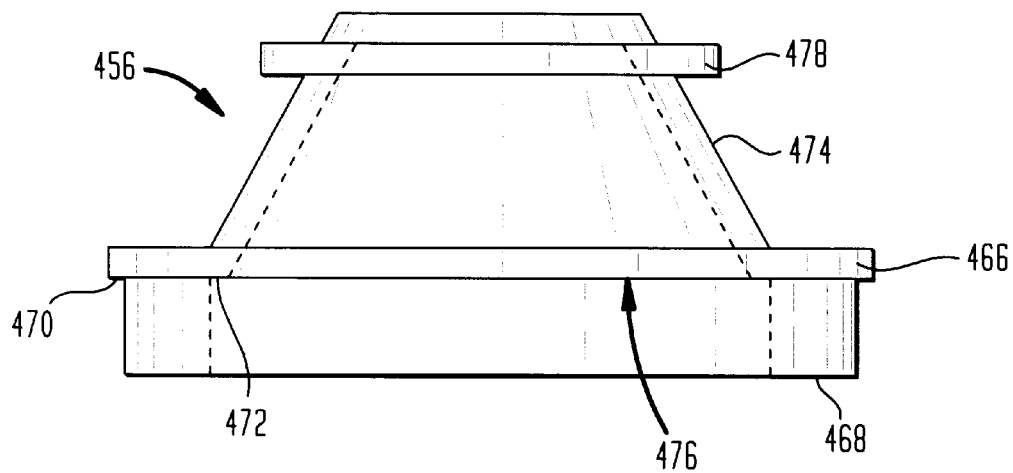
FIG. 9 is an elevation of the sanitizing canister end cap for the chlorinator/sanitizer shown in FIG. 8.
Figure 10:
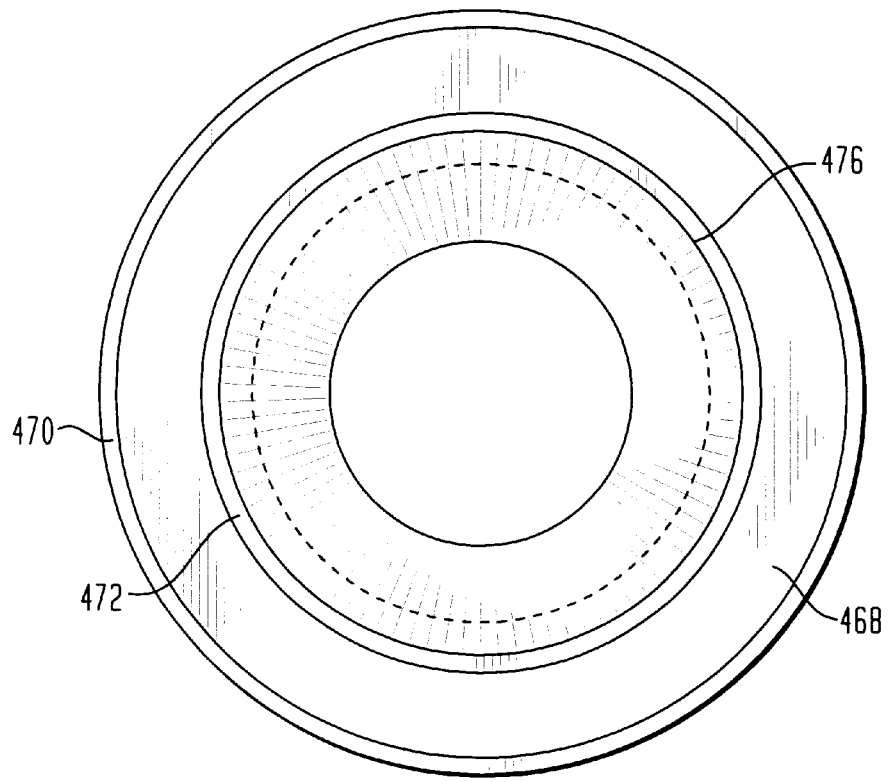
FIG. 10 is a bottom plan view of the sanitizing canister end cap shown in FIG. 9.

Referring to FIGS. 9 and 10, end cap 456 of the sanitizing canister 416 includes an annular partition 466 with a concentric, solid tube 468 affixed to one side. The tube 468 has an outer diameter less than the outer diameter of the partition 466, and forms an outer annular shoulder 470 around the outside of the partition 466. The outer perforated tube 452 rests on the outer annular shoulder 470 and is fixed to the partition 466 and the outside of tube 468 with epoxy or another suitable adhesive. The tube 468 has an inner diameter greater than the inner diameter of the partition 466 and the forms an inner annular shoulder 472 around the inside of the partition 466. The inner perforated tube 454 rests on the inner annular shoulder 472 and is fixed to the partition 466 and the inside of the tube 468 with epoxy or another suitable adhesive.

Still referring to FIGS. 9 and 10, the portion of the end cap 456 above the partition 466 includes a hollow frustum 474 with a large circular opening 476 in the bottom of the frustum 474. An external flange 478 is positioned just below the top of the hollow frustum 474. The flange 478 functions as a handle to lift the sanitizing canister 416 to remove or replace it within the chlorinator/sanitizer 410 after removing the cover 444.

Figure 11:
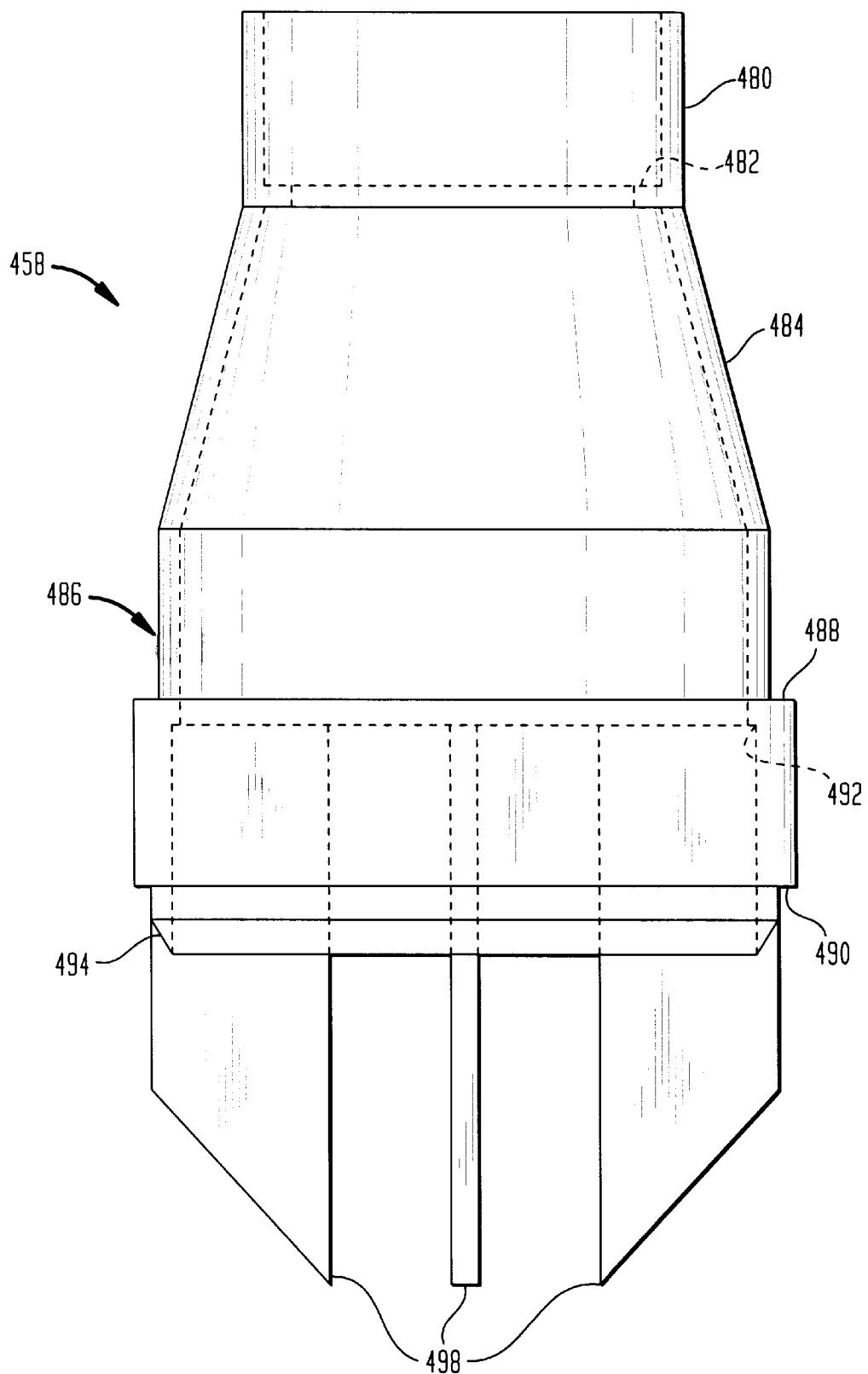
FIG. 11 is an elevation of the sanitizing canister outlet fitting for the chlorinator/sanitizer shown in FIG. 8.
Figure 12:
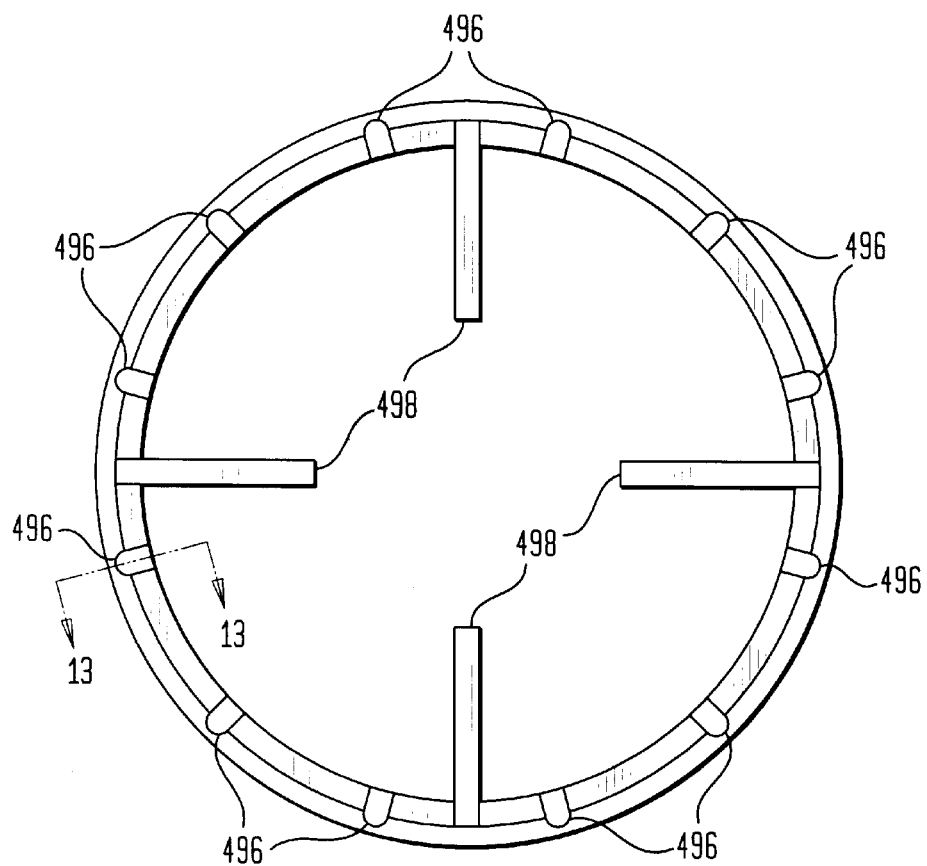
FIG. 12 is a bottom plan view of the sanitizing canister outlet fitting shown in FIG. 11.
Figure 13:
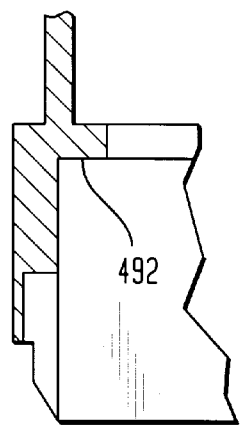
FIG. 13 is a cross-sectional view taken along section line A—A in FIG. 12.

The other end of the sanitizing canister 416 has a tubular outlet fitting 458. The outlet fitting 458 seals the annular space 460 containing the sanitizing media 464 and sealingly seats the sanitizing canister 416 in the outlet tube 432 in the base 424. This arrangement causes all of the fluid flow into the sanitizing chamber 420 to pass through the sanitizing canister 416 before exiting through the outlet tube 432. With particular reference to FIGS. 11–13, this configuration of the outlet fitting 458 allows retrofitting the sanitizing canister 416 to a commercially available Hayward model C-250CF, C-500CF, C-1100CF or C-1800CF Automatic Chemical Feeder or the like.

Referring to FIGS. 11–13, the outlet fitting 458 includes three sections. The top section 480 is tubular with an internal, annular shoulder 482. The middle section 484 is a tubular frustum with a larger diameter bottom. The bottom section 486 is also tubular. The bottom section includes three annular shoulders; namely, an external, upper shoulder 488, an external, lower shoulder 490 and an internal shoulder 492. A chamfer 494 is included around the lower end of the bottom section 486.

Twelve identical notches 496 are symmetrically spaced about the lower end of the bottom section 486. Also attached to the lower end of the bottom section 486 are four identical tapered fingers 498. The tapered fingers 498 are spaced at 90° intervals, equidistantly between adjacent notches 496 (see FIG. 12). These notches 496 align with structures in the form of fingers, ribs or the like (not shown) in the base 424. The number and orientation of these notches 496 or other openings or protrusions and the corresponding structures in the filter base 424 can be varied to uniquely fit a particular sanitizing canister 416 to a uniquely corresponding chlorinator/sanitizer 410.

Referring now to FIG. 11, the inner perforated tube 454 slides into the top section 486 of the outlet fitting 458, rests upon the annular shoulder 488 and is fixed inside the top section 486 with epoxy or another suitable adhesive. The outer perforated tube 452 slides around the top of the bottom section 486 and rests on the external, upper shoulder 488. The outer perforated tube 452 is also fixed to the bottom section 486 with epoxy or another suitable adhesive. The connections of the outlet fitting 458 and the end cap 456 to the perforated tubes 452, 454 seal the sanitizing media 464 within the annular space 460 between the perforated tubes 452, 454 completing the sanitizing canister 416. When the sanitizing canister 416 is positioned inside the sanitizer chamber 420, the external lower shoulder 490 of the outlet fitting 458 sealingly rests on the top of the outlet tube 432.

During operation in a typical swimming pool water circulation system, the chlorinator/sanitizer 410 may operate as a bypass or off-line system, typically arranged in parallel with a filter unit, so that only a small portion of the water from the pump is treated. Alternatively, the chlorinator/sanitizer 410 may operate as an in line system, located after the filter, whereby all of the water from the circulating pump is treated.

In either case, again referring to FIG. 8, the amount of water flow through the chlorinator/sanitizer 410 varies with the position of the metering valve 436. The water flow may be varied to any flow amount between no flow, when the metering valve 436 is closed, and maximum flow, when the metering valve 436 is fully open. The flow through the chlorinator/sanifizer 410, indicated by the flow arrows 500, begins at the water inlet 430 into the chlorinator chamber 418. The water then flows through and dissolves the chlorine chemical treatment media 450 within the chlorinator chamber 418 and becomes chlorinated. The now chlorinated water must flow to the top of the standpipe 414 to pass out of the chlorinator chamber 418 into the sanitizer chamber 420. This insures that air is drawn through the sanitizing canister 416 and does not build up in the chlorinator chamber 418.

The cylindrical sanitizing canister 416 is positioned within the hollow interior of the standpipe 414 in the sanitizing chamber 420 so that a clearance between the inside of the standpipe 414 and the outer perforated tube 452 of the sanitizing canister 416, sufficient for water to circulate, is maintained. By maximizing the diameters of the outer perforated tube 452 and the inner perforated tube 454, the inlet and outlet areas of the sanitizing canister 416 are also maximized. This maximization of areas, in conjunction with minimizing the thickness of the layer of sanitizing media 464, enables the full flow of the water through the chlorinator/sanitizer 410 to pass through the sanitizing canister 416 without an excessive pressure drop.

The outlet fitting 458 of the sanitizing canister 416 is removably and sealingly positioned in the outlet tube 432. All of the water flows through the sanitizing media 464 in the annular space 460 within the sanitizing canister 416, then into its cylindrical hollow core 462. Finally, the water flows through the outlet tube 432 and the water outlet 434 before exiting the chlorinator/sanitizer 410 through the ball check valve 438 which prevents return flow. Thus, the water passing through the chlorinator/sanitizer 410 is chlorinated and sanitized.

In another alternate embodiment (not shown), the chlorinator/sanitizer 410 illustrated in FIG. 8 may be modified by switching the positions of the metering valve 436 and the ball check valve 438. The flow path through the chlorinator/sanitizer 410 is reversed versus the direction indicated in FIG. 8. This allows water to be first sanitized and then chlorinated, in the event that the sanitizing media is not wholly compatible with chlorinated water.

Water enters the outlet chamber 422 through the repositioned metering valve 436 affixed to the water outlet 434. The water flows through the outlet tube 432 into the hollow interior 462 of the sanitizing canister 416 in the sanitizing chamber 420. Thence, water flows through the sanitizing media 464 in the annular space 460 between the perforated tubes 452, 454 where it is sanitized. Upon exiting the sanitizing canister 416, the water flows to the top of the sanitizing chamber 420, exiting over the top of the standpipe 414 into the chlorinator chamber 418.

The water then flows through the chlorine chemical treatment media 450 in the chlorinator chamber 418 where it is chlorinated. The water exits the chlorinator chamber 418 and the chlorinator/sanitizer 410 through the water inlet 430 and the repositioned ball check valve 438 which prevents any return flow. The water exits sanitized and chlorinated, respectively, by the chlorinator/sanitizer 410.

It should be noted that the embodiments described herein are merely exemplary and that a person skilled in the art may make many variations and modifications without departing from the spirit and scope of the invention. For instance, the embodiments disclosed may be adapted for any fluid, either liquid or gas, treatment application with any suitable chemical treatment media. All such variations and modifications are intended to be included within the scope of the invention as defined in the appended claims.

I claim:

1. A multi-chemical feeder device, comprising:
   a housing with a fluid inlet, a fluid outlet, and a plurality of chambers including at least a first chamber and a second chamber;
   a canister, having an outer fluid-permeable member and an inner fluid-permeable member forming a space therebetween so as to contain a first chemical composition therein, said canister having a hollow core bounded by said inner fluid-permeable member, said canister being positioned in said first chamber such that substantially all fluid flowing into said first chamber passes through said canister and around said first chemical composition contained therein;
   said second chamber containing a second chemical composition such that fluid flowing into said second chamber contacts said second chemical composition therein; and
   said first chamber and said second chamber being arranged within said housing such that fluid flows into said housing through said fluid inlet and into said chambers before exiting said housing through said fluid outlet.

2. A multi-chemical feeder device according to claim 1, wherein said space is toroidially-shaped.

3. A multi-chemical feeder device according to claim 2, wherein said outer fluid-permeable member and said inner fluid-permeable member are generally cylindrical and have a plurality of openings therein.

4. A multi-chemical feeder device according to claim 3, wherein said outer fluid-permeable member and said inner fluid-permeable member are fabricated from materials selected from the group consisting of plastic and metal.

5. A multi-chemical feeder device according to claim 2, wherein said canister is sealed at one end by a solid end cap and at the other end by an annular outlet fitting having a central bore communicating with said hollow core.

6. A multi-chemical feeder device according to claim 5, wherein said end cap comprises an annular partition with a solid concentric tube affixed to one side thereof, said concentric tube having an outer diameter smaller than an outer diameter of said annular partition, thereby forming an outer annular shoulder around an outer edge of said annular partition, said concentric tube having an inner diameter larger than an inner diameter of said annular partition, thereby forming an inner annular shoulder around an inner edge of said annular partition, said outer fluid-permeable member resting on said outer annular shoulder and being fixedly attached to said annular partition and to an outer surface of said concentric tube, said inner fluid-permeable member resting on said inner annular shoulder and being fixedly attached to said annular partition and to an inner surface of said concentric tube; and a hollow frustum attached to an opposite side of said annular partition, thereby closing said end cap and sealing one end of said canister.

7. A multi-chemical feeder device according to claim 6, wherein said outlet fitting comprises a tubular top section with an internal annular shoulder and a tubular frustum middle section which widens into a tubular bottom section, said bottom section being provided with an external upper shoulder and an external lower shoulder, said outer fluid-permeable member being slidable around said tubular bottom section, resting on said external upper shoulder, and being fixedly attached to said tubular bottom section, said inner fluid-permeable member being slidable around said tubular top section and being fixedly attached to said tubular top section, and further including a solid tube being slidable into said tubular top section, resting on said internal annular shoulder, and being fixedly attached inside said tubular top section, said solid tube extending to near said end cap of said canister, and said outlet fitting sealingly and removably attached to an outlet from said first chamber.

8. A multi-chemical feeder device according to claim 1, wherein the first chemical composition and the second chemical composition are independently rechargeable.

9. A multi-chemical feeder device according to claim 8, wherein said first chemical composition is a sanitizing media selected from the group consisting of silver-based bactericides, silver-based biocides, electrolytic metal compositions, and chlorine-based compositions.

10. A multi-chemical feeder device according to claim 9, wherein said second chemical composition is a chlorine-based composition.

11. A multi-chemical feeder device according to claim 8, wherein said chambers are arranged within said housing in series and such that the full flow of fluid into said housing through said fluid inlet flows through each of said chambers before exiting said housing through said fluid outlet.

12. A multi-chemical feeder device according to claim 11, wherein said chambers are arranged such that fluid flows through said first chamber prior to flowing through said second chamber.

13. A multi-chemical feeder device according to claim 11, wherein said chambers are arranged such that fluid flows through said second chamber prior to flowing through said first chamber.

14. A multi-chemical feeder device according to claim 8, further comprising
   an inlet chamber and an outlet chamber;
   said inlet chamber being in fluid communication with said first chamber and said second chamber; and
   said outlet chamber being in fluid communication with said first chamber and said second chamber, said multi-chemical feeder device providing at least two parallel flow paths including a first flow path being from said inlet chamber through said first chamber into said outlet chamber and a second flow path being from said inlet chamber through said second chamber into said outlet chamber, said chambers being arranged within said housing such that the full flow of fluid into the housing through said fluid inlet into said inlet chamber is divided between said parallel flow paths to said outlet chamber before exiting said housing through said fluid outlet.

15. A multi-chemical feeder device according to claim 14, further comprising means to control fluid communication from said inlet chamber to said second chamber.

16. A multi-chemical feeder device according to claim 15, further comprising means to prevent fluid communication from said second chamber to said first chamber.

17. A multi-chemical feeder device according to claim 16, further comprising means to prevent fluid communication from said second chamber to said inlet chamber.

18. A multi-chemical feeder device according to claim 17, further comprising means to prevent fluid communication from said outlet chamber to said first chamber.

19. A multi-chemical feeder device according to claim 18, further comprising means to induce fluid flow from said second chamber to said outlet chamber.

20. A multi-chemical feeder device according to claim 19, wherein said means to control fluid communication from said inlet chamber to said second chamber includes a metering valve between said inlet chamber and said second chamber, said means to prevent fluid communication from said second chamber to said first chamber includes a removable and resealable access opening between said first chamber and said second chamber, a non-return device between said second chamber and said inlet chamber, and a non-return device between said first chamber and said outlet chamber, said means to prevent fluid communication from said second chamber to said inlet chamber includes a non-return device between said second chamber and said inlet chamber, said means to prevent fluid communication from said outlet chamber to said first chamber includes a non-return device between said first chamber and said outlet chamber, and said means to induce fluid flow from said second chamber to said outlet chamber includes a venturi tube between said second chamber and said outlet chamber and further includes a venturi standpipe attached to said venturi tube and extending to near the top of said second chamber.

21. A series multi-chemical feeder, comprising:

a housing with a fluid inlet, a fluid outlet, and a plurality of chambers including at least a first chamber and a second chamber;

a canister, having an outer fluid-permeable member and an inner fluid-permeable member forming a space therebetween so as to contain a first chemical composition therein, said canister having a hollow core bounded by said inner fluid-permeable member, said canister being positioned in said first chamber such that substantially all fluid flowing into said first chamber passes through said canister and around said first chemical composition contained therein;

said second chamber containing a second chemical composition such that said second chemical composition does not directly mechanically commingle with said first chemical composition and such that fluid flowing into said second chamber contacts said second chemical composition therein; and said chambers being arranged within said housing in series and such that the full flow of fluid into said housing through said fluid inlet flows through each of said chambers before exiting said housing through said fluid outlet.

22. A parallel multi-chemical feeder, comprising:

a housing with a fluid inlet, a fluid outlet, and a plurality of chambers including a first chamber, a second chamber, an inlet chamber and an outlet chamber;

a canister, having an outer fluid-permeable member and an inner fluid-permeable member forming a space therebetween so as to contain a first chemical composition therein, said canister having a hollow core bounded by said inner fluid-permeable member, said canister being positioned in said first chamber such that substantially all fluid flowing into said first chamber passes through said canister and around said first chemical composition contained therein;

said second chamber containing a second chemical composition such that said second chemical composition does not mechanically commingle with said first chemical composition and fluid flowing into said second chamber contacts said second chemical composition therein;

said inlet chamber being in fluid communication with said first chamber and said second chamber;

said outlet chamber being in fluid communication with said first chamber and said second chamber;

means to control fluid communication from said inlet chamber to said second chamber;

means to prevent fluid communication from said second chamber to said first chamber;

means to prevent fluid communication from said second chamber to said inlet chamber;

means to prevent fluid communication from said outlet chamber to said first chamber;

means to induce fluid flow from said second chamber to said outlet chamber; and said parallel multi-chemical feeder device providing at least two parallel flow paths including a first flow path being from said inlet chamber through said first chamber into said outlet chamber and a second flow path being from said inlet chamber through said second chamber into said outlet chamber, said chambers being arranged within said housing such that the full flow of fluid into the housing through said fluid inlet into said inlet chamber is divided between said parallel flow paths to said outlet chamber before exiting said housing through said fluid outlet.

* * * * *